Reissued Sept. 20, 1932

Re. 18,603

UNITED STATES PATENT OFFICE

ALBERT M. CLIFFORD, OF STOW, OHIO, ASSIGNOR TO THE GOODYEAR TIRE & RUBBER COMPANY, OF AKRON, OHIO, A CORPORATION OF OHIO

RUBBER COMPOUND AND METHOD OF PRESERVING IT

No Drawing. Original No. 1,823,531, dated September 15, 1931, Serial No. 216,780, filed August 31, 1927. Application for reissue filed June 9, 1932. Serial No. 616,357.

My invention relates to the treatment of rubber and has for its primary object the provision of a material which is adapted to be incorporated in rubber for the purpose of retarding the deterioration thereof.

One of the chief objects of the invention is to provide an antioxidant for rubber composed of the reaction product of a diamine and a naphthalene compound such as a naphthol.

By the incorporation of certain amino bodies in a rubber compound, the physical and chemical characteristics of the latter are materially affected. Certain of these compounds are employed as accelerators of the rate of vulcanization of rubber. Another group, when introduced into rubber, causes a reduction of oxidation or "ageing" of the rubber, thus greatly prolonging the period of usefulness of articles manufactured therefrom.

one-half mol of anhydrous calcium chloride. These materials are then heated in a closed vessel for a period of from five to eight hours at a temperature of approximately 270 degrees C. When the reaction is complete, a yellow reaction product separates out as a layer upon the top of the other materials. This reaction product is separated from the other materials and purified by washing, first with water, then with dilute acid, and finally with dilute ammonia. The washed material is then dried and may be obtained as a crystalline product by crystallization from either alcohol or xylene. The melting point of the crystalline material ranges from 146 to 148 degrees C. The crystalline nature of this material and the fact that it has a very definite melting point, are strongly indicative that it is a true chemical reaction product, the chemical equation for which is represented as follows:

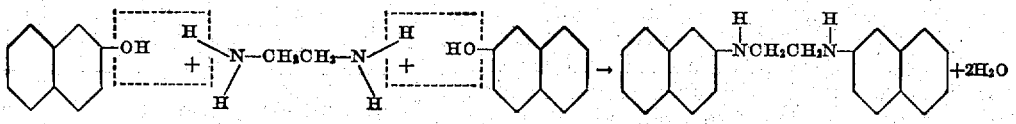

I have made the discovery that naphthyl substituted diamines may be employed in a rubber compound as antioxidants. These materials may be prepared by the reaction of the naphthols, either alpha or beta, on a diamine. Theoretically, the general reaction of these substances is represented as follows:

The above method is not limited to the specific materials indicated, but is of general application in the preparation of all materials of this class.

My invention is not limited to the reaction products of alkylene diamines and naphthols, but also includes the reaction products of

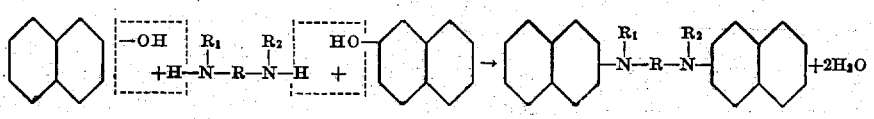

In the above equation R represents a hydrocarbon residue, either aryl or alkyl, and $R_1$ and $R_2$ represent hydrogen atoms or substitutes therefor.

Illustrative of compounds falling within the scope of my invention is the reaction product of beta naphthol and ethylene diamine. This material may be manufactured by the following method. Intermix molecular quantities of beta naphthol and ethylene diamine, or a slight excess of the latter, with arylene diamines and the naphthols. A specific example of the latter material is the reaction product of metaphenylene diamine and naphthol. This material may be prepared by substantially the same process as that employed in the manufacture of the reaction product of ethylene diamine and the beta naphthol. The material thus obtained is resin-like in appearance and has a melting point of approximately 100 degrees C. This resin-like substance is believed to consist of two reaction products (symmetrical dibeta naphthyl meta phenylene diamine and unsymmetrical mono beta naphthyl meta phenylene diamine). The reactions between the amino body and the naphthol may be represented by the following equations:

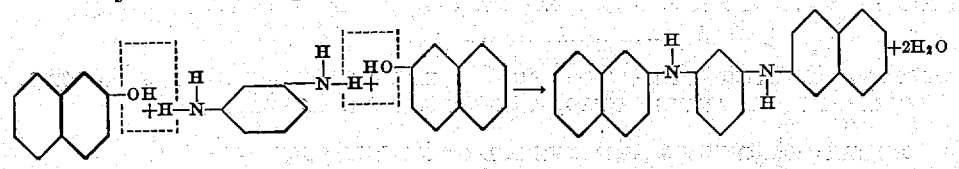

or

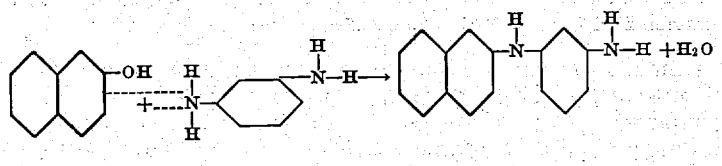

The materials prepared according to the above processes may be incorporated in most of the standard rubber compounds containing various proportions of the compounding ingredients. The following is an example of a formula which has been found to give excellent results:

| | Parts by weight |
|---|---|
| Acetone extracted pale crepe rubber | 100 |
| Zinc oxide | 5 |
| Sulfur | 3 |
| Stearic acid | 1.5 |
| Hexamethylene tetramine | 1 |
| Antioxidant | 1 |

Tests conducted upon samples prepared in accordance with the formula clearly show the value of the materials as antioxidants. The data obtained from the tests is contained in the following tables, Tables I and II containing the data obtained from samples which had not been subjected to artificial ageing.

TABLE I

*Sym. di (beta naphthylamino) ethane*

| Cure | | 500% elong. kgs/cm² | 700% elong. kgs/cm² | Tensile strength kgs/cm² | Percent elong. at break |
|---|---|---|---|---|---|
| Time in mins. | Lbs. per sq. in. | | | | |
| 30 | 40 | 19 | 61 | 126 | 835 |
| 50 | 40 | 27 | 100 | 163 | 795 |
| 70 | 40 | 38 | 143 | 192 | 755 |

TABLE II

*M-phenylene diamine derivative of beta naphthol*

| | | | | | |
|---|---|---|---|---|---|
| 30 | 40 | 15 | 47 | 86 | 820 |
| 50 | 40 | 24 | 78 | 132 | 800 |
| 70 | 40 | 29 | 106 | 160 | 770 |

Samples were also tested to ascertain their age-resisting properties by subjecting them to a temperature of 50 degrees C. and a pressure of 150 pounds per square inch in an oxygen bomb for six days. The results obtained are indicated in tables III and IV appended hereto. It will be observed that the tensile strength in most cases is materially improved after subjection to the artificial ageing, and that but a slight increase in weight, due to the absorption of oxygen, is observed.

TABLE III

*Sym. di (beta naphthylamino) ethane*

| Cure | | 500% elong. kgs/cm² | 700% elong. kgs/cm² | Tensile strength kgs/cm² | Percent elong. at break | % wt. inc. |
|---|---|---|---|---|---|---|
| Time in mins. | Lbs. per sq. in. | | | | | |
| 30 | 40 | 23 | 71 | 117 | 800 | 0.10 |
| 50 | 40 | 34 | 118 | 167 | 765 | 0.12 |
| 70 | 40 | 43 | 152 | 188 | 740 | 0.28 |

TABLE IV

*M-phenylene diamine derivative of beta naphthol*

| | | | | | | |
|---|---|---|---|---|---|---|
| 30 | 40 | 20 | 65 | 116 | 815 | 0.00 |
| 50 | 40 | 30 | 102 | 173 | 800 | 0.00 |
| 70 | 40 | 38 | 137 | 176 | 750 | 0.32 |

The chemical formulas which have been given in explanation of the reactions which take place during the process of preparation of the antioxidants are believed to be in accordance with the generally accepted theories. However, the usefulness of my invention is not dependent upon the correctness of the latter, and consequently the validity of any patents obtained should not be affected thereby.

Although I have disclosed only the preferred embodiments of my invention and described those embodiments in detail, it will be apparent to those skilled in the art that it is not so limited, but that various minor modifications and changes may be made therein without departing from the spirit of the invention or the scope of the appended claims. It is intended that the patent shall cover, by suitable expression in the appended claims, whatever features of patentable novelty reside in the invention.

What I claim is:

1. A method of preserving rubber which comprises incorporating a substance having the chemical formula

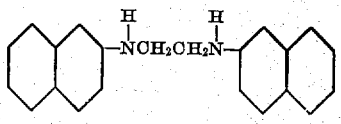

into a rubber compound and vulcanizing the mixture.

2. A method of preserving rubber which comprises incorporating dinaphthyl ethylene diamine into a rubber compound and vulcanizing the mixture.

3. A rubber product which has been vulcanized in the presence of the reaction product of a naphthol and ethylene diamine.

4. A rubber product which has been vulcanized in the presence of dinaphthyl ethylene diamine.

5. A method of preserving rubber which comprises incorporating therein a reaction product of a naphthol with a diamine selected from a group consisting of ethylene diamine and phenylene diamine.

6. A method of preserving rubber which comprises incorporating therein a material having the following formula:

$$R-\overset{H}{\overset{|}{N}}-R_1-\overset{H}{\overset{|}{N}}-R_2,$$

in which R and $R_2$ are naphthalene groups, and $R_1$ is a group selected from a group consisting of benzene and ethylene.

7. A rubber product that has been vulcanized in the presence of a material having the formula:

$$R-\overset{H}{\overset{|}{N}}-R_1-\overset{H}{\overset{|}{N}}-R_2,$$

in which R and $R_2$ are naphthalene groups and $R_1$ is a radical selected from a group consisting of ethylene and phenylene.

In witness whereof I have hereunto signed my name.

Signed at Akron, in the county of Summit and State of Ohio, U. S. A., this 3d day of June, 1932.

ALBERT M. CLIFFORD.